Feb. 11, 1941.  W. W. TEUBER  2,231,487
SUPPORTING DEVICE
Filed Aug. 30, 1939
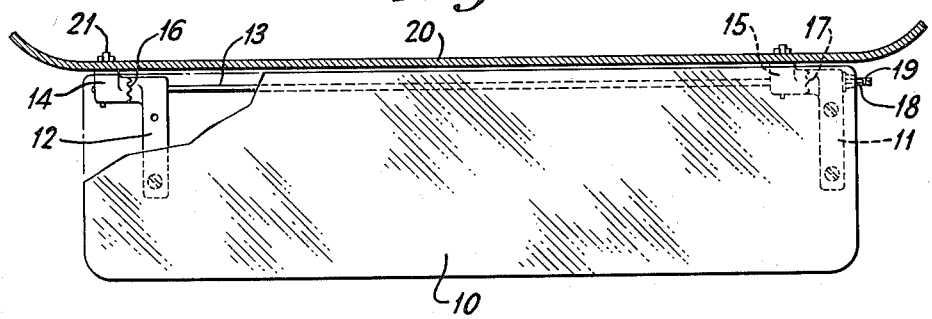
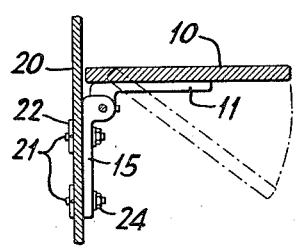
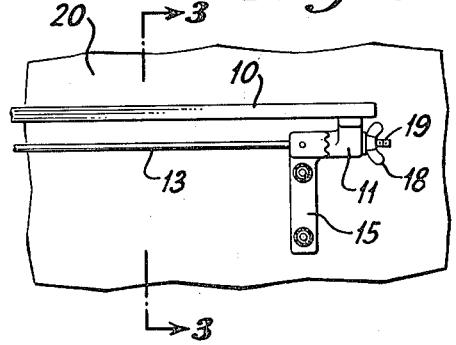
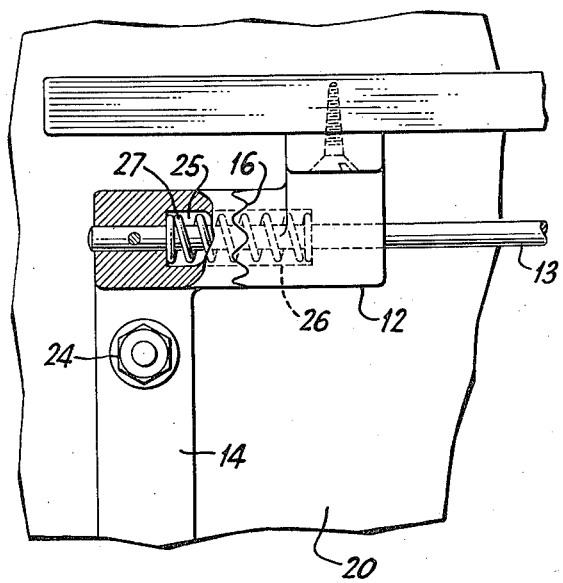
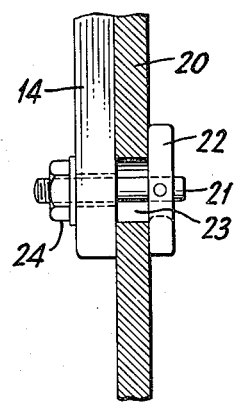
INVENTOR.
WALTER W. TEUBER
BY William A. Zalesak Patented Feb. 11, 1941

2,231,487

UNITED STATES PATENT OFFICE 2,231,487

SUPPORTING DEVICE

Walter W. Teuber, Elizabeth, N. J.

Application August 30, 1939, Serial No. 292,587

6 Claims. (Cl. 248—240)

My invention relates to supporting devices, more particularly to tables or shelves which although suitable for general use are particularly useful where space is at a premium.

In cars, bungalows, trucks, lunch wagons and the like, floor and wall space is at a premium. Various kinds of shelves and tables have been devised but conventional devices as a rule are not of simple construction, sturdy or easily installed. They are not easily collapsible or adjustable to desired positions. Supporting members usually provided for shelves require floor space, which is at a premium.

It is therefore the principal object of my invention to provide an improved supporting device of the kind described, which is simple and sturdy, which can be readily installed in cars, trucks, bungalows and the like and which can be easily adjusted and locked in an adjusted position.

It is a further object of my invention to provide such a device which is collapsible and which is easily folded out of the way when not in use, and which does not utilize valuable floor space for supporting members such as legs and brackets.

The novel features which I believe to be characteristic of my invention are set forth with particularity in the appended claims, but the invention itself will best be understood by reference to the following description taken in connection with the accompanying drawing in which Figure 1 is a top view of my invention, Figure 2 is a partial side view of the right hand side of the device made according to my invention showing details of construction, Figure 3 is a section taken along line 3—3 of Figure 1, and Figures 4 and 5 show details of construction of a device made according to my invention.

In Figure 1 the supporting device comprises a shelf or table 10 to which is fixed the bracket members 11 and 12. These bracket members are provided with apertures so that they may be slidably and rotatably mounted on the supporting rod 13. This rod in turn is supported in brackets 14 and 15 and is fixed against side-wise movement or rotation in the bracket 14.

The brackets 11 and 12, 14 and 15 are provided with cooperating interlocking teeth at 16 and 17 and are normally held in engagement by forcing the shelf to the left to engage these teeth and is locked in position by means of the wing nut 18 screwed on the threaded end 19 of the supporting rod 13 as best shown in Figure 2.

To release the shelf so that it can be adjusted to any angle the wing nut 18 is backed off to permit the shelf to be slid to the right to disengage the teeth. It can then be rotated and reengaged at any angle and locked in position by means of the wing nut 18.

As best shown in Figure 5, the brackets 14 and 15 are securely fixed to any retaining wall, for example the back wall of the front seat of an automobile, by means of the swivel head bolts 21 provided with the U-shaped swivel head 22 so that bolt 21 can be received between the legs of the U when the bolt and head are in alignment. The head and bolt are extended through an aperture with the head and bolt in alignment, the head being rotated through 90° into the position shown after the bolt has been inserted. The bracket is maintained in fixed position by means of the nut 24 which can then be screwed up tight.

To assist in the movement of the shelf to disengage the teeth on the brackets when the wing nut is released, the brackets may be provided as shown in Figure 4 with cup-shaped depressions 25 and 26 to form a chamber in which the spring 27 is mounted and which is retained under compression when the teeth are interlocked.

It will be apparent that a device made according to my invention is simple and sturdy, can be readily installed on any supporting wall, can be easily adjusted and locked in an adjusted position, is readily folded out of the way to occupy a minimum of space when not in use, and does not utilize valuable floor space for supporting legs or other means of support.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A collapsible support to be fixed to a supporting wall for supporting a shelf, and including a pair of brackets to be fixed to said shelf, a supporting rod, said brackets being slidably and rotatably supported on said rod, a pair of brackets to be attached to the supporting wall and fixedly supporting said rod, and cooperating interlocking means on said brackets for maintaining said shelf locked in a predetermined adjusted position.

2. A collapsible support to be fixed to a supporting wall for supporting a shelf, and including a pair of brackets to be fixed to said shelf, a supporting rod, said brackets being slidably and rotatably supported on said rod, a pair of brackets to be attached to the supporting wall and fixedly supporting said rod, and cooperating interlocking means on said brackets for maintaining said shelf in the predetermined adjusted position, and other means for maintaining said bracket in interlocked position.

3. A collapsible support to be fixed to a supporting wall for supporting a shelf, and including a pair of brackets to be fixed to said shelf, a supporting rod, said brackets being slidably and rotatably supported on said rod, a pair of brackets to be attached to the supporting wall and fixedly supporting said rod, cooperating interlocking teeth on said brackets for maintaining said shelf in the predetermined adjusted position, and means for maintaining said teeth in interlocked position.

4. A collapsible support to be fixed to a supporting wall for supporting a shelf, and including a pair of brackets to be fixed to said shelf, a supporting rod, said brackets being slidably and rotatably supported on said rod, a pair of brackets to be attached to the supporting wall and fixedly supporting said rod, cooperating interlocking teeth on said brackets for maintaining said shelf in the predetermined adjusted position, and a wing nut on said rod for forcing said teeth into interlocked position and for maintaining said brackets in interlocked position.

5. A collapsible support to be fixed to a supporting wall for supporting a shelf, and including a pair of brackets to be fixed to said shelf, a supporting rod, said brackets being slidably and rotatably supported on said rod, a pair of brackets to be attached to the supporting wall and fixedly supporting said rod, cooperating interlocking teeth on said brackets for maintaining said shelf in the predetermined adjusted position and means for maintaining said teeth in interlocked position, said brackets being provided with oppositely disposed hollow chambers cooperating to form a chamber, a spring under compression enclosed in said chamber, said spring being biased to cause movement of the shelf to disengage the teeth.

6. A collapsible support to be fixed to a supporting wall for supporting a shelf, and including a pair of brackets to be fixed to said shelf, a supporting rod, said brackets being slidably and rotatably supported on said rod, a pair of brackets to be attached to the supporting wall and fixedly supporting said rod, cooperating interlocking teeth on said brackets for maintaining said shelf in the predetermined adjusted position, a nut on said rod for forcing said teeth in interlocked position for maintaining said shelf in the predetermined position, said brackets being provided with oppositely disposed hollow chambers cooperating to form a chamber, a spring under compression enclosed in said chamber, said spring causing movement of the shelf to disengage the teeth when the nut is released.

WALTER W. TEUBER.